United States Patent
Pearce

(10) Patent No.: US 7,243,066 B2
(45) Date of Patent: Jul. 10, 2007

(54) METHOD AND APPARATUS FOR MITIGATING THE EFFECT OF TRANSMISSION ERRORS IN A DISTRIBUTED SPEECH RECOGNITION PROCESS AND SYSTEM

(75) Inventor: David John Benjamin Pearce, Basingstoke (GB)

(73) Assignee: Motorola, Inc., Schaumburg, IL (US)

( * ) Notice: Subject to any disclaimer, the term of this patent is extended or adjusted under 35 U.S.C. 154(b) by 752 days.

(21) Appl. No.: 10/297,162

(22) PCT Filed: Jun. 5, 2001

(86) PCT No.: PCT/EP01/06366

§ 371 (c)(1),
(2), (4) Date: Jul. 18, 2003

(87) PCT Pub. No.: WO01/95311

PCT Pub. Date: Dec. 13, 2001

(65) Prior Publication Data

US 2004/0039569 A1    Feb. 26, 2004

(30) Foreign Application Priority Data

Jun. 5, 2000    (GB) ................................. 0013528.5

(51) Int. Cl.
*G10L 15/20*    (2006.01)
(52) U.S. Cl. ..................................... 704/228
(58) Field of Classification Search ................. 704/228
See application file for complete search history.

(56) References Cited

U.S. PATENT DOCUMENTS 6,633,839 B2 * 10/2003 Kushner et al. ............ 704/205

FOREIGN PATENT DOCUMENTS

GB    2 343 777 A    5/2000

OTHER PUBLICATIONS

Reichl et al. "A Codec for Sppech Recognition in a Wireless System." *IEEE/AFCEA EUROCOMM. Information Systems for Enhanced Public Safety and Security*; pp. 34-37.

De Veth J. et al. "Acoustic Backing-off in the Local Distance Computation for Robust Automatic Speech Recognition." *International Conference on Spoken Language Processing 1998*; Nov. 1998, pp. 1427-1430.

Karry et el. "Solutions for robust recognition of the GSM Cellular Network," *Acoustics, Speech and Signal Processing. 1998. Proceedings of the 1998 IEEE International Conference*; May 1998, pp. 261-264.

* cited by examiner

*Primary Examiner*—Susan McFadden
(74) *Attorney, Agent, or Firm*—Lawrence J. Chapa; Brian M. Mancini

(57) ABSTRACT

A method and apparatus for distributed speech recognition serve to mitigate the effect of transmission errors. The method comprises the steps of identifying speech recognition parameters which have been subjected to a transmission error, and processing data to be sent to the speech recognition decoder to ensure that any speech recognition parameters which have been subjected to such an error are excluded from back-end processing. The speech recognition parameters which have been subjected to transmission errors are excluded from back-end processing by replacing those parameters with data which is selected so as to be rejected by the speech recognition decoder as abnormal and/or non-speechlike.

14 Claims, 2 Drawing Sheets

METHOD AND APPARATUS FOR MITIGATING THE EFFECT OF TRANSMISSION ERRORS IN A DISTRIBUTED SPEECH RECOGNITION PROCESS AND SYSTEM

FIELD OF THE INVENTION

The present invention relates to a method of mitigating the effect of transmission errors in a distributed speech recognition system. The present invention also relates to an apparatus for mitigating the effect of transmission errors in a distributed speech recognition system. The present invention is suitable for, but not limited to, mitigating the effect of transmission errors affecting speech recognition parameters when they are transmitted over a radio communications link.

BACKGROUND OF THE INVENTION

Speech recognition is a process for automatically recognising sounds, parts of words, words, or phrases from speech. Such a process can be used as an interface between man and machine, in addition to or instead of using more commonly used tools such as switches, keyboards, mouse and so on. A speech recognition process can also be used to retrieve information automatically from some spoken communication or message.

Various methods have been evolved, and are still being improved, for providing automatic speech recognition. Some methods are based on extended knowledge with corresponding heuristic strategies, others employ statistical models.

In typical speech recognition processes, the speech to be processed is sampled a number of times in the course of a sampling time-frame. In a typical process the speech may be sampled at a rate in the range of 8–20 Khz and there may be in the order of 50 to 100 sampling frames per second. The sampled values are processed using algorithms to provide speech recognition parameters. For example, one type of speech recognition parameter consists of a coefficient known as a mel cepstral coefficient. Such speech recognition parameters are arranged in the form of vectors, also known as arrays, which can be considered as groups or sets of parameters arranged in some degree of order. The sampling process is repeated for further sampling time-frames. A typical format is for one vector to be produced for each sampling time-frame.

The above parameterisation and placing into vectors constitutes what can be referred to as the front-end operation of a speech recognition process. The above described speech recognition parameters arranged in vectors are then analysed according to speech recognition techniques in what can be referred to as the back-end operation of the speech recognition process. In a speech recognition process where the front-end process and the back-end process are carried out at the same location or in the same device, the likelihood of errors being introduced into the speech recognition parameters, on being passed from the front-end to the back-end, is minimal.

However, in a process known as a distributed speech recognition process, the front-end part of the speech recognition process is carried out remotely from the back-end part. The speech is sampled, parameterised and the speech recognition parameters arranged in vectors, at a first location. The speech recognition parameters are quantified and then transmitted, for example over a communications link of an established communications system, to a second location. Often the first location will be a remote terminal, and the second location will be a central processing station. The received speech recognition parameters are then analysed according to speech recognition techniques at the second location.

Many types of communications links, in many types of communications systems, can be considered for use in a distributed speech recognition process. One example is a conventional wireline communications system, for example a public switched telephone network. Another example is a radio communications system, for example TETRA. Another example is a cellular radio communications system. One example of an applicable cellular communications system is a global system for mobile communications (GSM) system, another example is systems such as the Universal Mobile Telecommunications System (UMTS) currently under standardisation.

The use of any communications link, in any communications system, causes the possibility that errors will be introduced into the speech recognition parameters as they are transmitted from the first location to the second location over the communications link.

It is known to provide error detection techniques in communications systems such that the presence of an error in a given portion of transmitted information is detectable. One well known technique is cyclic redundancy coding.

When the presence of an error is detected, different mitigating techniques are employed to reduce the effect of errors according to the nature of the information transmitted. Techniques for reducing the effects of errors which occur during transmission of other forms of information are not necessarily suited to reducing the effect of transmission errors in a distributed speech recognition process. This is due to the specialised speech recognition techniques the parameters are subjected to, and hence it is desirable to provide means for mitigating the effect of transmission errors in a distributed speech recognition process.

Prior art published UK patent application GB-A-2343777 concerns the mitigation of errors in a distributed speech recognition system. The method identifies a group comprising one or more vectors, which have undergone a transmission error. In one embodiment, whole vectors are replaced by a copy of whichever of the preceding or following errror free vectors is closest in receipt order to the vector being replaced.

SUMMARY OF THE INVENTION

The present invention provides a means to reduce the effect of transmission errors in a distributed speech recognition process.

According to one aspect of the present invention, there is provided a method of mitigating the effect of transmission errors in a distributed speech recognition system, as claimed in claim 1.

According to another aspect of the invention, there is provided apparatus for mitigating the effect of transmission errors in a distributed speech recognition system, as claimed in claim 8.

In some embodiments the data to be sent to the back-end decoder is processed by replacing at least one speech recognition parameter identified as having been subjected to an error with data selected so as to be rejected by the speech recognition decoder as abnormal.

Such embodiments provide means for mitigating the effect of transmission errors which rely on the operation of the speech recognition back-end decoder whilst avoiding the need to change the back-end code.

An alternative technique for reducing the effect of transmission errors in a distributed speech recognition process is to detect errors in the received parameters and signal to the speech recognition back-end decoder when an error is detected. However, this would require the back-end to be adapted to act on such signals. In practice this would result in a need to change the back-end code.

Further aspects of the invention are as claimed in the dependent claims.

The invention mitigates the effect of transmission errors in a distributed speech recognition process. Additional specific advantages are apparent from the following description and figures.

DESCRIPTION OF EMBODIMENTS OF THE INVENTION

Figure 1:
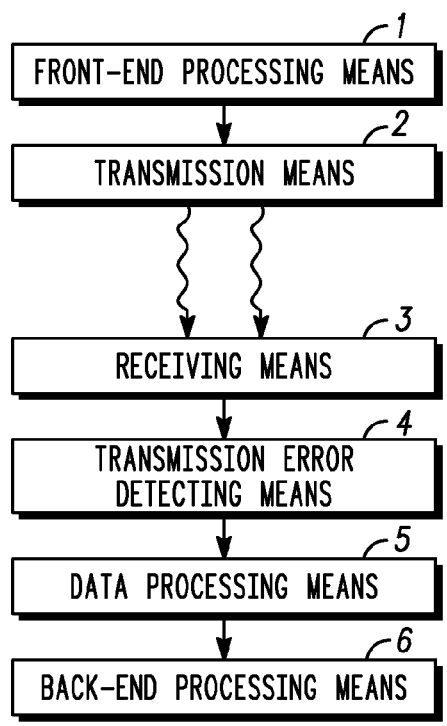
FIG. 1 is a schematic illustration of an apparatus for distributed speech recognition in accordance with the invention.

FIG. 1 schematically shows an apparatus for distributed speech recognition for use in an embodiment of the present invention. The apparatus generally comprises front end processing means 1 for generating speech recognition parameters on the basis of a sampled speech signal as will be described in more detail below with particular reference to FIG. 2. An output of the front end processing means 1 is connected to a transmission means which is arranged to operate on the speech recognition parameters and to transmit the parameters together with other necessary information over a communication link to a remote location. As mentioned in the introduction to the application many types of communication links can be used but it is particularly envisaged that the present invention would be used in mobile communication systems.

At the remote location the signals transmitted over the communications network are received by receiving means 3 which is arranged to pass on the transmitted data to a transmission error detecting means 4 which is arranged to identify any speech recognition parameters which have been subjected to transmission errors on their passage across the communications network. The transmission error detecting means 4 is connected to data processing means 5 which is arranged for replacing the data associated with any speech recognition parameters which have been identified as having been subjected to a transmission error. The data processing means 5 is connected to back-end processing means 6 which comprises a decoder arranged to operate on the received speech recognition parameters to complete the distributed speech recognition process.

The distributed speech recognition process is considered in more detail below.

Figure 2:
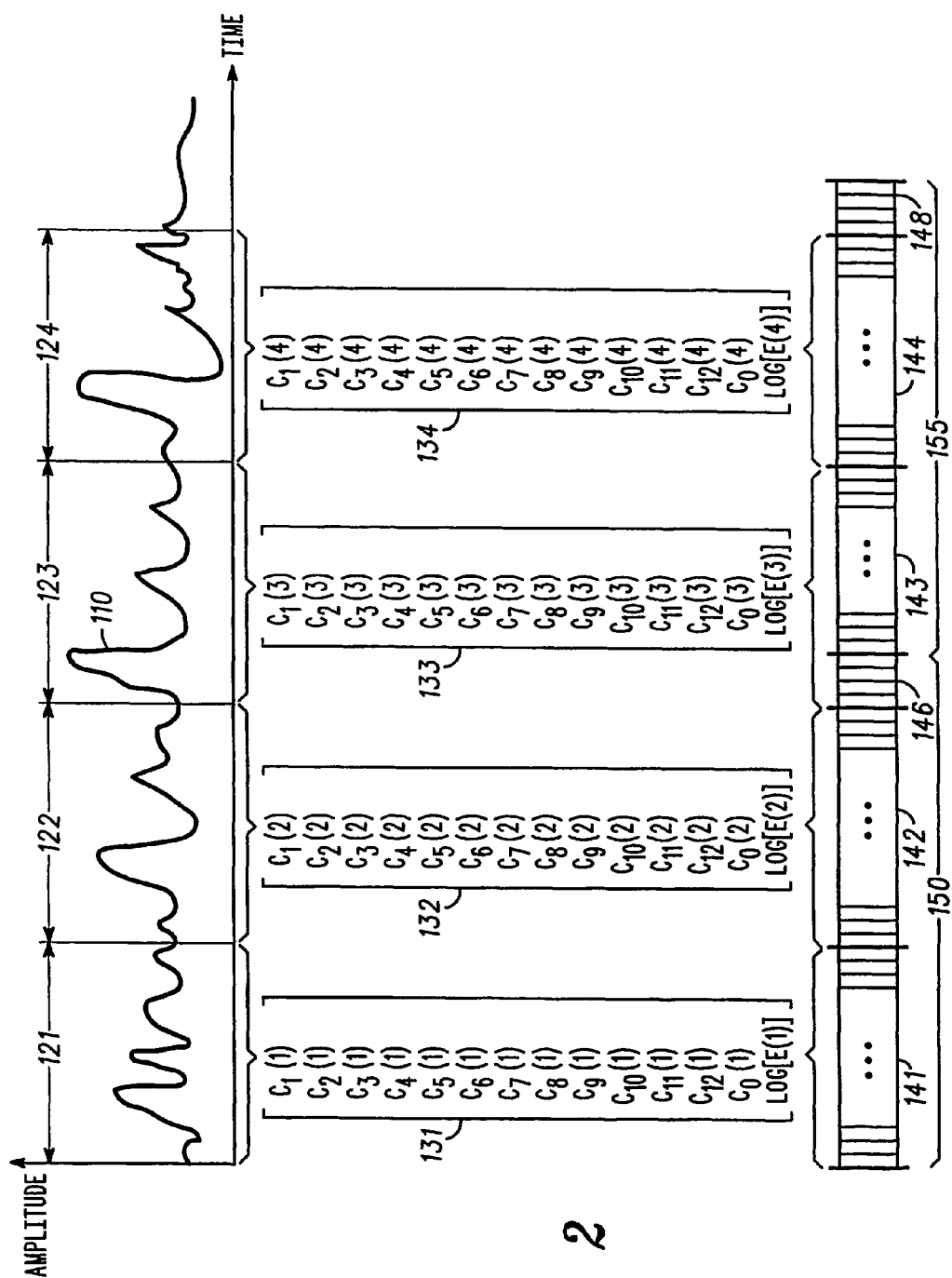
FIG. 2 is a schematic illustration of speech recognition parameters arranged in vectors corresponding to sampling time-frames used in a distributed speech recognition process.

In a distributed speech recognition process to which an embodiment of the invention is applied, the speech recognition parameters are arranged in vectors corresponding to sampling time-frames as shown schematically in FIG. 2.

A portion of speech signal 110 to be processed is shown in FIG. 2. Speech signal 110 is shown in greatly simplified form, since in practise it will consist of a much more complicated sequence of sample values.

Sampling time-frames, of which in FIG. 2 are shown a first sampling time-frame 121, a second sampling time-frame 122, a third sampling time-frame 123 and a fourth sampling time-frame 124, are imposed upon the speech signal as shown in FIG. 2. In the embodiment described below there are 100 sampling time-frames per second. The speech signal is sampled repeatedly in the course of each sampling time-frame.

In the embodiment described below, the speech recognition process is one in which a total of fourteen speech recognition parameters are employed. The first twelve of these are the first twelve static mel cepstral coefficients, i.e.

$$c(m)=[c_1(m),c_2(m),\ldots,c_{12}(m)]^T,$$

where m denotes the sampling time-frame number. The thirteenth speech recognition parameter employed is the zeroth cepstral coefficient, i.e. $c_0(m)$. The fourteenth speech recognition parameter employed is a logarithmic energy term, i.e. $\log[E(m)]$. Details of these coefficients and their uses in speech recognition processes are well known in the art and do not require further description here. Moreover, it is noted that the invention can be carried out with other combinations of cepstral coefficients forming the speech recognition parameters, likewise with other choices or schemes of speech recognition parameters other than cepstral coefficients.

The fourteen parameters for each sampling time-frame are arranged, or formatted, into a corresponding vector, also known as an array, as shown in FIG. 2. Vector 131 corresponds to sampling time-frame 121, vector 132 corresponds to sampling time-frame 122, vector 133 corresponds to sampling time-frame 123, and vector 134 corresponds to sampling time-frame 124. Such a vector can generally be represented as $$y(m)=\begin{bmatrix} c(m) \\ c_0(m) \\ \log[E(m)] \end{bmatrix}.$$

The speech recognition parameters are processed prior to transmission from a first location to a second location. In the embodiment described below this is carried out as follows. The parameters from vector 131 are quantized. This is implemented by directly quantizing the vector with a split vector quantizer. Coefficients are grouped into pairs, and each pair is quantized using a vector quantization (VQ) codebook predetermined for that respective pair. The resulting set of index values is then used to represent the speech frame. Coefficient pairings, by front-end parameter are as shown in Table 1, along with the codebook size used for each pair.

TABLE 1

| Split Vector Quantization Feature Pairings | | | | |
|---|---|---|---|---|
| Codebook | Size | Weight Matrix ($W^{i,i+1}$) | Element 1 | Element 2 |
| $Q^{0,1}$ | 64 | I | $c_1$ | $c_2$ |
| $Q^{2,3}$ | 64 | I | $c_3$ | $c_4$ |
| $Q^{4,5}$ | 64 | I | $c_5$ | $c_6$ |

TABLE 1-continued

Split Vector Quantization Feature Pairings

| Codebook | Size | Weight Matrix ($W^{i,i+1}$) | Element 1 | Element 2 |
|---|---|---|---|---|
| $Q^{6,7}$ | 64 | I | $c_7$ | $c_8$ |
| $Q^{8,9}$ | 64 | I | $c_9$ | $c_{10}$ |
| $Q^{10,11}$ | 64 | I | $c_{11}$ | $c_{12}$ |
| $Q^{12,13}$ | 256 | non-identity | $c_0$ | log[E] |

The closest VQ centroid is found using a weighted Euclidian distance to determine the index, $$d_j^{i,i+1} = \begin{bmatrix} y_i(m) \\ y_{i+1}(m) \end{bmatrix} - q_j^{i,i+1}$$

$$idx^{i,i+1}(m) = 0 \leq j \leq (N^{i,i+1}-1) \; \{(d_j^{i,i+1})^t W^{i,i+1}(d_j^{i,i+1})\},$$
$$i = 0, 2, 4, K, 12$$

where $q_j^{i,i+1}$ denotes the jth codevector in the codebook $Q^{i,i+1}$, $N^{i,i+1}$ is the size of the codebook, $W^{i,i+1}$ is the (possibly identity) weight matrix to be applied for the codebook $Q^{i,i+1}$, and $idx^{i,i+1}(m)$ denotes the codebook index chosen to represent the vector $[y_i(m), y_{i+1}(m)]^T$.

The indices that are produced are then represented in the form of 44 bits. These 44 bits are placed in the first 44 slots, as shown by reference numeral 141 in FIG. 2, of a bit stream frame 150. The corresponding 44 bits produced for the following vector, namely vector 132, are placed in the next 44 slots, as shown by reference numeral 142 in FIG. 2, of the bit stream frame 150. The remaining bits of the bit stream frame 150 consist of 4 bits of cyclic redundancy code, as shown by reference numeral 146 in FIG. 2, the value of the bits being determined such as to provide error detection, in a known fashion, for the whole of the 88 preceding bits of the bit stream frame 150. Similarly, the 44 bits provided from vector 133 are placed in the first 44 slots, as shown by reference numeral 143 in FIG. 2, of a second bit stream frame 155. Also, the corresponding 44 bits produced for the following vector, namely vector 134, are placed in the next 44 slots, as shown by reference numeral 144 in FIG. 2, of the bit stream frame 155. The remaining bits of the bit stream frame 155 consist of 4 bits of cyclic redundancy code, as shown by reference numeral 148 in FIG. 2. This arrangement is repeated for following vectors. The above described format of the bit stream frames, in which bit data from two vectors is arranged in a single combined bit stream frame, is merely exemplary. For example, each vector's data could instead be arranged in a single bit stream frame containing its own error detection bits. Similarly the number of slots per bit stream frame is merely exemplary. It should also be noted that the vector compression technique described above is merely exemplary.

For the sake of avoiding any confusion, it is pointed out that the bit stream frames described above should not be confused with transmission frames that are then used in the transmission of the bit stream data over the communications link of the communications system in which the data is transmitted from a first location to a second location, for example the time division multiple access (TDMA) time frames of a GSM cellular radio communications system, which is the communications system employed in the embodiments herein described. In the present example the first location consists of a remote user station, and the second, i.e. receiving location, consists of a centralised processing station, which can be located for example at a base station of the cellular communications system. Hence in the embodiments herein described the speech recognition parameters are transmitted between the first and second locations over a radio communications link. However, it is to be appreciated that the nature of the first location and the second location will depend upon the type of communications system under consideration and the arrangement of the distributed speech recognition process therein.

The bit stream frames are reconstituted from their transmission format at the second location after being received there.

Figure 3:
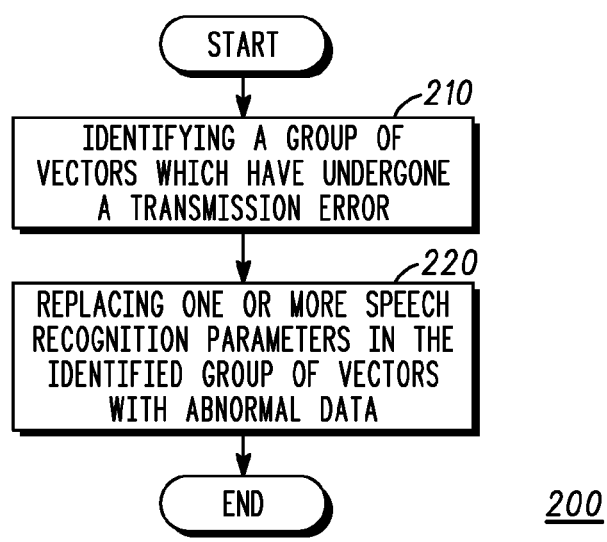
FIG. 3 is a process flow chart of an embodiment of the present invention.

Thus, above is described a distributed speech recognition process in which speech recognition parameters are arranged in vectors corresponding to sampling time-frames and said speech recognition parameters are received at a second location having been transmitted from a first location. A method of reducing the effect of transmission errors in such a speech recognition process according to the present embodiment is shown in process flow chart 200 of FIG. 3. Referring to FIG. 3, function box 210 shows the step of identifying a group comprising one or more of said vectors which have undergone a transmission error. In the present embodiment error detection is carried out by comparing the 4 cyclic redundancy coding bits such as 146, 148 with the contents of the respective bit stream frames 150, 155, using known cyclic redundancy code methods. This will identify, in the present example, any single bit stream frame that has undergone a transmission error. Thus in the present example the identified group of vectors consists of two vectors, that is the pair of vectors from the single bit stream frame. If, in another example, each bit stream frame with error detection means contained only one vector, then the identified group of vectors would be a single vector. It is to be appreciated that the exact form and technical reason determining how many vectors are in such an identified group will depend on the different ways in which the vectors have been arranged in bit streams, and moreover how an error detection method has been imposed on top of that. Particularly, error detection methods other than the cyclic redundancy coding employed in the present embodiment might provide other numbers of vectors in an identified group. Also, for any given bit stream arrangement, subsidiary design choices of how to process the error information can also play a role in determining the number of vectors in an identified group. For example, with reference to the present embodiment, it could be decided for reasons of conserving processing power to only consider whether batches of bit stream frames contain an error, even if the error detection means were physically capable of more narrowly detecting the error.

The speech recognition parameters are retrieved from the bit stream frames by carrying out a reverse version of the vector quantization procedure described above. More particularly, indices are extracted from the bit stream, and using these indices, vectors are reconstituted in the form $$\begin{bmatrix} \hat{y}_i(m) \\ \hat{y}_{i+1}(m) \end{bmatrix} = q_{idx^{i,i+1}(m)}^{i,i+1} \quad i = 0, 2, 4, \ldots, 12$$

Function box 220 shows the next step of the present embodiment, namely the step of replacing one or more speech recognition parameters in the identified group of vectors with abnormal data as discussed in more detail below. In the present embodiment the order of the different processing steps is carried out such that all of the received speech recognition parameters are retrieved from the bit stream frames and temporarily stored, prior to replacement of one or more speech recognition parameters with abnormal data. However, it is noted that the one or more speech recognition parameters could alternatively be replaced by altering the bit stream information in a corresponding fashion before actually physically retrieving the speech recognition parameters, including the newly introduced replacement ones, from the bit stream format.

As is well known to those skilled in the art speech recognition decoders which are used to carry out the back-end processing are typically arranged so that when a vector of speech recognition parameters corresponding to a sampling time frame is received and this gives an abnormally high cost when comparing that frame against the decoder's word models, that frame (i.e. the vector of parameters) is rejected by the decoder. Typically the speech recognition decoder will then replace the score or probability associated with that frame with a default value. Conventional back-end speech recognition decoders are generally provided with this ability to reject frames in order to cope with frames which are badly distorted by a burst of noise. In the present invention this ability of back-end speech recognition decoders to reject abnormal or non-speech like frames is made use of to mitigate the effect of transmission errors. Thus this system has the advantage that it becomes unnecessary to adapt the back-end speech recognition decoder to deal with transmission errors and thus the need to change the back-end code is avoided. At the same time the chance of adversely affecting the speech recognition process by using a more active error correction technique is avoided.

As mentioned above, in the present embodiment, once it has been identified that a bit stream frame 150,155 has undergone a transmission error it is known that one or more of the speech recognition parameters in either of the two associated vectors 131,132;133,134 has been subjected to a transmission error. In the present embodiment all of the speech parameters in the identified group of two vectors are replaced by a set of pre-computed values which have been selected such that they are a large distance away from any that would occur in natural speech and therefore will be rejected by the back-end decoder as abnormal. Thus as described above the back-end coder will substitute a default score and the chance of the erroneous data influencing the speech recognition process is avoided.

In the vector quantization process described above, the vector quantizers operate on pairs of cepstral parameters. This process is such that each vector quantizer bounds the range of possible values which can be decoded for the respective pair of cepstral parameters during the vector reconstitution process mentioned above. In the present embodiment this fact is used to select the abnormal data. Alternative values for each cepstral parameter are determined which lie outside the allowed range and which are more than some threshold distance away from all of the quantizer centroids. This in turn ensures that on receipt of a frame, i.e. a vector of parameters, including these alternative pre-computed values, the back-end decoder will register a very high cost and reject this frame in favour of the defaults score as mentioned above.

In the present embodiment each bit stream frame 150,155 contains two vectors and the error detection technique is such that a detected transmission error is associated with both of the vectors. Therefore, the computed alternative values for the cepstral parameters are replaced in both of the vectors when it is determined that that bit stream frame 150,155 has undergone a transmission error. However, as mentioned above if different error detection techniques are used then it may be only necessary to replace the cepstral parameters in one vector or it may become necessary to replace the parameters in a larger number of vectors.

In the case of the embodiment described above, the data processing steps described are carried out by a programmable digital signal processing device, such as one selected from the DSP56xxx (trademark) family of devices from Motorola. Alternatively an application specific integrated circuit (ASIC) can be employed. Other possibilities also exist. For example, an interface unit can be employed that interfaces between a radio receiver and a computer system forming part of a back-end speech recognition processor.

The invention claimed is:

1. A method of mitigating the effect of transmission errors in a distributed speech recognition process, the distributed speech recognition process being one in which speech recognition parameters are arranged in vectors corresponding to sampling time-frames at a first location, and are received at a second location for processing by a speech recognition decoder having been transmitted from the first location, the method comprising the steps of:
   receiving one or more vectors, each vector including one or more speech recognition parameters;
   identifying a group comprising one or more of said vectors which has undergone a transmission error; and
   processing data to be sent to the speech recognition decoder to ensure that at least one speech recognition parameter in the identified group is excluded from backend processing.

2. A method according to claim 1 in which all the speech recognition parameters of each vector of said group are excluded from backend processing.

3. A method according to claim 1 in which the step of processing data to be sent to the speech recognition decoder comprises the step of replacing said at least one speech recognition parameter with data selected so as to be rejected by the speech recognition decoder as abnormal.

4. A method according to claim 3 in which the selected data comprises one or more speech recognition parameter having a value substantially different from any that would occur in natural speech.

5. A method according to claim 3 in which the speech recognition parameters are subjected to quantization before transmission, and reconstitution after transmission, wherein the quantization bounds a range of possible values which the parameters can take on reconstitution and said selected data comprises one or more value outside said range.

6. A method according to claim 5 further comprising the steps of: using a split vector quantization technique in which each quantizer operates on a pair of
   speech recognition parameters; and choosing said selected data to comprise one or more value removed from each quantizer
   centroid by at least a predetermined amount.

7. A method according to claim 3 in which the backend processing comprises the step of substituting a default value for the score generated when processing the selected abnormal data.

8. An apparatus for mitigating the effect of transmission errors in a distributed speech recognition process, the distributed speech recognition process being one in which speech recognition parameters are arranged in vectors corresponding to sampling time-frames at a first location and are received at a second location for processing by a speech recognition decoder having been transmitted from the first location, the apparatus comprising: receiving means for receiving one or more vectors, each vector including one or more speech recognition parameters;

identifying means for identifying a group comprising one or more of said vectors which has undergone a transmission error; and data processing means for processing data to be sent to the speech recognition decoder to ensure that at least one speech recognition parameter in the identified group is excluded from backend processing.

9. An apparatus according to claim 8 in which the processing means is arranged to exclude all the speech recognition parameters of each vector of said group from backend processing.

10. An apparatus according to claim 8 in which the processing means is arranged to replace said at least one speech recognition parameter with data selected so as to be rejected by the speech recognition decoder as abnormal.

11. An apparatus according to claim 10 in which the selected data comprises one or more speech recognition parameter having a value substantially different from any that would occur in natural speech.

12. An apparatus according to claim 10 further comprising: means for quantizing the speech recognition parameters before transmission, and means for reconstitution of the parameters after transmission, wherein the quantization bounds a range of possible values which the parameters can take on reconstitution and said selected data comprises one or more value outside said range.

13. An apparatus according to claim 12 in which the quantization means is arranged for performing a split vector quantization in which each quantizer operates on a pair of speech recognition parameters and said selected data comprises one or more value removed, by at least a predetermined amount, from each quantizer centroid.

14. An apparatus according to claim 8 in which the backend decoder comprises means for substituting a default value for the score generated when processing the selected abnormal data.

\* \* \* \* \*